US008521856B2

(12) United States Patent
Davis (10) Patent No.: US 8,521,856 B2
(45) Date of Patent: Aug. 27, 2013

(54) DYNAMIC NETWORK CONFIGURATION

(75) Inventor: Gary Martin Davis, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1143 days.

(21) Appl. No.: 11/967,174

(22) Filed: Dec. 29, 2007

(65) Prior Publication Data
US 2009/0172151 A1 Jul. 2, 2009

(51) Int. Cl.
*G06F 15/173* (2006.01)

(52) U.S. Cl.
USPC .......... 709/223; 709/216; 709/224; 370/356; 370/392

(58) Field of Classification Search
USPC ......... 709/223, 224, 203, 217, 219; 370/219, 370/356, 392
See application file for complete search history.

(56) References Cited

U.S. PATENT DOCUMENTS

| | | | |
|---|---|---|---|
| 6,195,705 B1 * | 2/2001 | Leung | 709/245 |
| 6,556,547 B1 * | 4/2003 | Srikanth et al. | 370/317 |
| 6,751,191 B1 * | 6/2004 | Kanekar et al. | 370/217 |
| 7,006,431 B1 * | 2/2006 | Kanekar et al. | 370/217 |
| 7,234,163 B1 * | 6/2007 | Rayes et al. | 726/22 |
| 7,562,390 B1 * | 7/2009 | Kwan | 726/23 |
| 8,055,768 B2 * | 11/2011 | Saunderson et al. | 709/224 |
| 8,077,604 B1 * | 12/2011 | Kanekar et al. | 370/219 |
| 8,107,396 B1 * | 1/2012 | Sharma | 370/254 |
| 8,189,600 B2 * | 5/2012 | Jabr et al. | 370/395.53 |
| 8,239,929 B2 * | 8/2012 | Kwan et al. | 726/11 |
| 8,416,796 B2 * | 4/2013 | Forster et al. | 370/419 |
| 2003/0043853 A1 * | 3/2003 | Doyle et al. | 370/489 |
| 2003/0126268 A1 * | 7/2003 | Berthaud et al. | 709/229 |
| 2004/0215752 A1 * | 10/2004 | Satapati et al. | 709/223 |
| 2004/0215821 A1 * | 10/2004 | Regan et al. | 709/240 |
| 2005/0257002 A1 * | 11/2005 | Nguyen | 711/114 |
| 2005/0286518 A1 * | 12/2005 | Park et al. | 370/389 |
| 2006/0209818 A1 * | 9/2006 | Purser | 370/389 |
| 2006/0242287 A1 * | 10/2006 | Cetin et al. | 709/223 |
| 2006/0248229 A1 * | 11/2006 | Saunderson et al. | 709/245 |
| 2007/0115967 A1 * | 5/2007 | Vandenberghe et al. | 370/389 |
| 2012/0076048 A1 * | 3/2012 | Kanekar et al. | 370/254 |

OTHER PUBLICATIONS

Beck ("Dealing with Public Ethernet Jacks—Switches, Gateways and Authentication", http://portal.acm.org/citation.cfm?id=1039853, Feb. 2002, pp. 1-11).*

* cited by examiner

*Primary Examiner* — Lashonda Jacobs
(74) *Attorney, Agent, or Firm* — Cesari and McKenna, LLP (57) ABSTRACT

In one embodiment, determining a default gateway of a network, determining a MAC address and an IP address associated with the default gateway of the network, updating a table of one or more MAC addresses and corresponding one or more IP addresses based on the detected MAC address and the IP address of the default gateway, detecting in the table of one or more MAC addresses and the corresponding one or more IP addresses, a further MAC address associated with the IP address of the default gateway, determining a port associated with the further MAC address and with the IP address of the default gateway, and disabling the port, are provided.

23 Claims, 7 Drawing Sheets

DYNAMIC NETWORK CONFIGURATION

TECHNICAL FIELD

The present disclosure relates to gateway security in a network. More specifically, the present disclosure relates to methods of preventing duplication of Internet Protocol (IP) addresses of gateways in a network.

BACKGROUND

In many of today's large scale networks, Internet Protocol (IP) address configuration is usually performed automatically, often by a Dynamic Host Configuration Protocol (DHCP) server. The DHCP server controls the IP addresses of PC host systems on the network, excluding the IP addresses of the gateways of the network. Protocols such as Hot Standby Router Protocol (HSRP) and Virtual Router Redundancy Protocol (VRRP) are used to define a default gateway in a network, while protocols such as Gateway Load Balancing Protocol (GLBP) use a basic load balancing function to balance the workload between multiple gateway routers.

Occasionally, computers or other host devices will have manually configured IP addresses, and will attempt to connect to the network. When this occurs, there are instances where the manually configured IP address associated, for example, with a rogue PC, will be a duplicate of one of the existing gateway IP addresses. In this case, data packets are not forwarded to the intended destination, potentially resulting in a severe problem that disrupts traffic on the network.

Currently, when a problem like this occurs, the only switch to discover the problem is the gateway switch in the distribution layer of the network. However, in the case that the rogue host device is connected to an access layer switch, the access layer switch is where the problem lies, and as such, is where the problem must be fixed. Unfortunately, the distribution layer switch currently only has the ability to send a system log message to the administration informing of a duplicate IP address. This message does not include information on which access switch, or which port on said access switch, to which the rogue host device is connected. Therefore, the network administrators must manually trace through the network to find the rogue device before deactivating the port. This is time consuming and inefficient in managing the network.

SUMMARY

Overview

A method in particular embodiments may include determining a default gateway of a network, determining a MAC address and an IP address associated with the default gateway of the network, updating a table of one or more MAC addresses and corresponding one or more IP addresses based on the detected MAC address and the IP address of the default gateway, detecting in the table of one or more MAC addresses and the corresponding one or more IP addresses, a further MAC address associated with the IP address of the default gateway, determining a port associated with the further MAC address, and disabling the port associated with the further MAC address.

These and other features and advantages of the present disclosure will be understood upon consideration of the following description of the particular embodiments and the accompanying drawings.

DESCRIPTION OF EXAMPLE EMBODIMENTS

Figure 1:
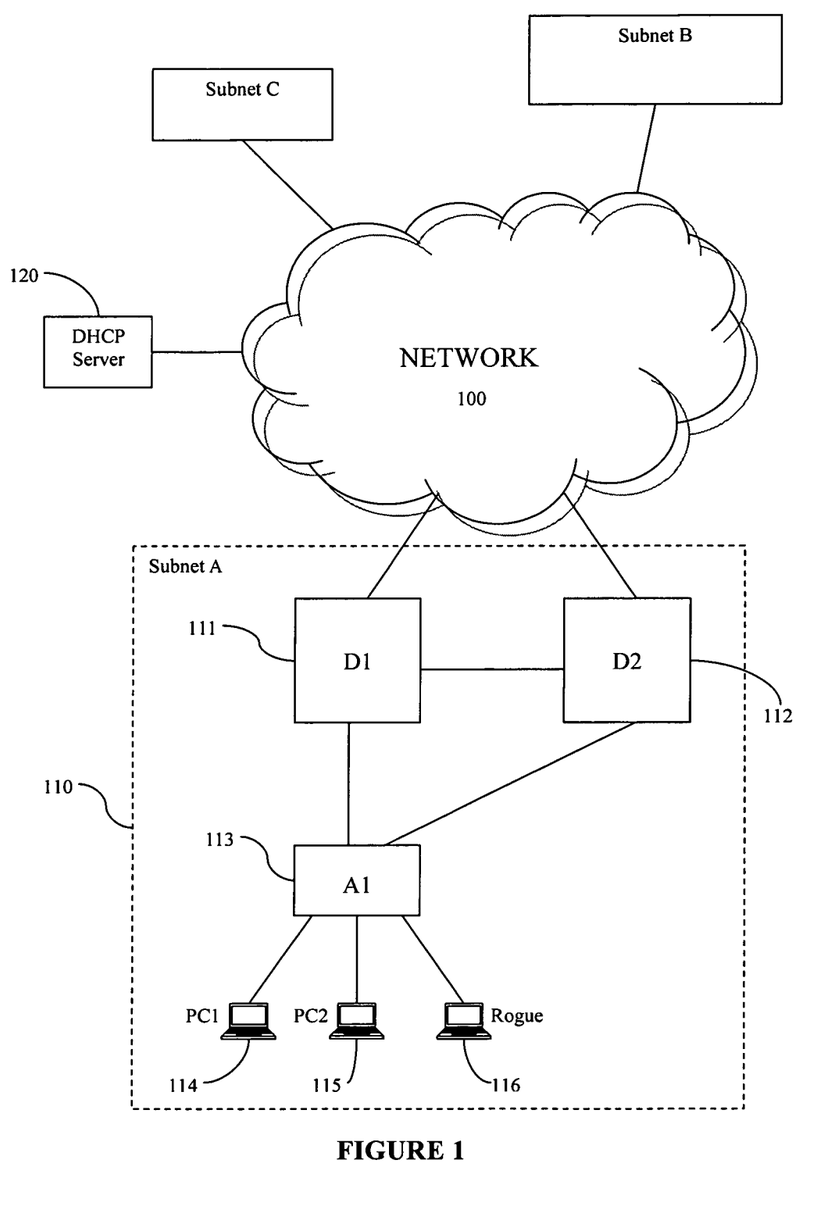
FIG. 1 is a diagram representing a network for use in one embodiment of the present disclosure.

FIG. 1 is a diagram representing a network for use in one embodiment of the present disclosure. Referring to FIG. 1, subnet A 110 is a subnet of a network 100 including distribution layer switches 111, 112, access layer switch 113, and host devices 114-116, such as personal computers or terminals (PCs), for example. In one embodiment of the present disclosure, subnet A 110 includes a layer 2 distribution/access network with layer 2 looped topology, with protocols for establishing a fault-tolerant default gateway running between the redundant distribution layer switches 111, 112. Examples of such protocols for establishing a default gateway include, for example, redundancy protocol such as Hot Standby Router Protocol (HSRP), or Virtual Router Redundancy Protocol (VRRP), among others.

While FIG. 1 shows only two distribution layer switches 111, 112 and one access layer switch 113, it is understood that there may be any number of distribution layer switches 111, 112 in the subnet 110 of the network 100, and any number of access layer switches 113 coupled to the distribution layer switches 111, 112 in the subnet 110 of the network 100. In one embodiment of the present disclosure, a protocol for establishing a default gateway in the subnet 110 of the network 100, such as HSRP, runs between the distribution layer switches 111, 112, providing information via a multicast transmission to the switches in the subnet 110 of the Media Access Control (MAC) address and corresponding Internet Protocol (IP) address of the default gateway determined by the HSRP or other protocol for establishing a default gateway.

The default gateway may be any one of the distribution layer switches 111, 112 in the subnet 110 of the network 100. The MAC address and corresponding IP address of the default gateway may be stored in a table of MAC address and IP address pairs located in the memory of the distribution layer switches 111, 112 of the subnet 110 of the network 100. An example of such table includes an Address Resolution Protocol (ARP) table, however, it is understood that any table containing information of the MAC address and IP addresses of switches in the network may be used.

Still referring to FIG. 1, as shown, in one aspect, access layer switch 113 is coupled to the distribution layer switches 111, 112, and host devices 114-116, such as PCs, are coupled to the access layer switch 113. While FIG. 1 shows only three host devices 114-116 coupled to the access layer switch 113, it is understood that any number of host devices 114-116 may be coupled to the any number of access layer switches 113 in the subnet 110 of the network 100. In the network setup, the access layer switch 113 is aware of the IP address of the default gateway, however, although the multicast transmission of the protocol for establishing a default gateway is transmitted to all switches in the subnet 110 of the network 100, the access layer switch 113 does not typically listen to or detect the multicast transmission. Therefore, the access layer switch 113 does not know the MAC address associated with the IP address of the default gateway. However, as the transmission of the protocol for establishing a default gateway is a multicast transmission, the access layer switch 113 may be configured to listen for the multicast transmission, thus learning the MAC address associated with the IP address of the default gateway. When the access layer switch 113 is configured to listen for the multicast transmission of the protocol for establishing a default gateway, the table of MAC addresses and IP addresses, herein referred to as the ARP table, for example, may be updated to include the information for the default gateway.

Still referring to FIG. 1, Dynamic Host Configuration Protocol (DHCP) may be used to automatically configure the IP addresses of the host devices 114-116 in the network. The DHCP may be stored on a separate DHCP server 120 in the network. In another embodiment of the present disclosure, while the DHCP server will prevent duplicate IP addresses from occurring in the network, it is possible for a rogue host device 116 to connect to a switch 113 in a subnet 110 of the network 100 with a manually configured IP address. In this case, there is a possibility of the manually configured IP address to be a duplicate of the default gateway IP address. When this happens, the IP address of the default gateway is associated or linked to the MAC address of the rogue host device 116 and this change appears in the ARP table. This change in the ARP table may appear as an overwriting of the MAC address of the default gateway that is associated with the IP address of the default gateway, with the MAC address of the rogue host device 116.

When the change in the ARP table is detected by the access layer switch 113 to which the rogue host device 116 is connected, the access layer switch 113 refers to a table of MAC addresses and corresponding port numbers, such as a forwarding table, to determine the port to which the rogue host device 116 is connected. This port may then be disabled, and the next transmission by the default gateway will refresh the ARP table in the switches to indicate the correct MAC address and corresponding IP address of the default gateway.

Still referring to FIG. 1, in yet another embodiment of the present disclosure, subnet A 110 may have a load balancing router redundancy protocol, such as, but not limited to, for example, Gateway Load Balancing Protocol (GLBP). In a network setup with a load balancing router redundancy protocol solution, such as GLBP, for example, the host load is balanced between a predetermined number of gateway distribution layer switches 111, 112. Therefore, there may be no single default gateway. In this case, the access layer switch 113 may be configured to listen to the multicast transmission of the GLBP and update its ARP table to include the MAC and IP address information of all the gateway switches 111, 112 in the distribution layer. When a rogue host device 116 with a manually configured IP address that is the same as the IP address of any of the gateway distribution layer switches 111, 112, connects to an access layer switch 113, the change in MAC address associated with the IP address of the gateway is reflected in the ARP table. This change in the ARP table appears as an overwriting of the MAC address of the gateway switch that is associated with the IP address of one of the gateway switches 111, 112 in the distribution layer of the subnet 110, with the MAC address of the rogue host device 116.

When the change in the ARP table is detected by the access layer switch 113 to which the rogue host device 116 is connected, the access layer switch 113 refers to a table of MAC addresses and corresponding port numbers, such as a forwarding table, to determine the port to which the rogue host device 116 is connected. This port may then be disabled, and the next multicast transmission by the GLBP will refresh the ARP table to indicate the correct MAC addresses and corresponding IP addresses of the gateway distribution layer switches 111, 112.

Figure 2:
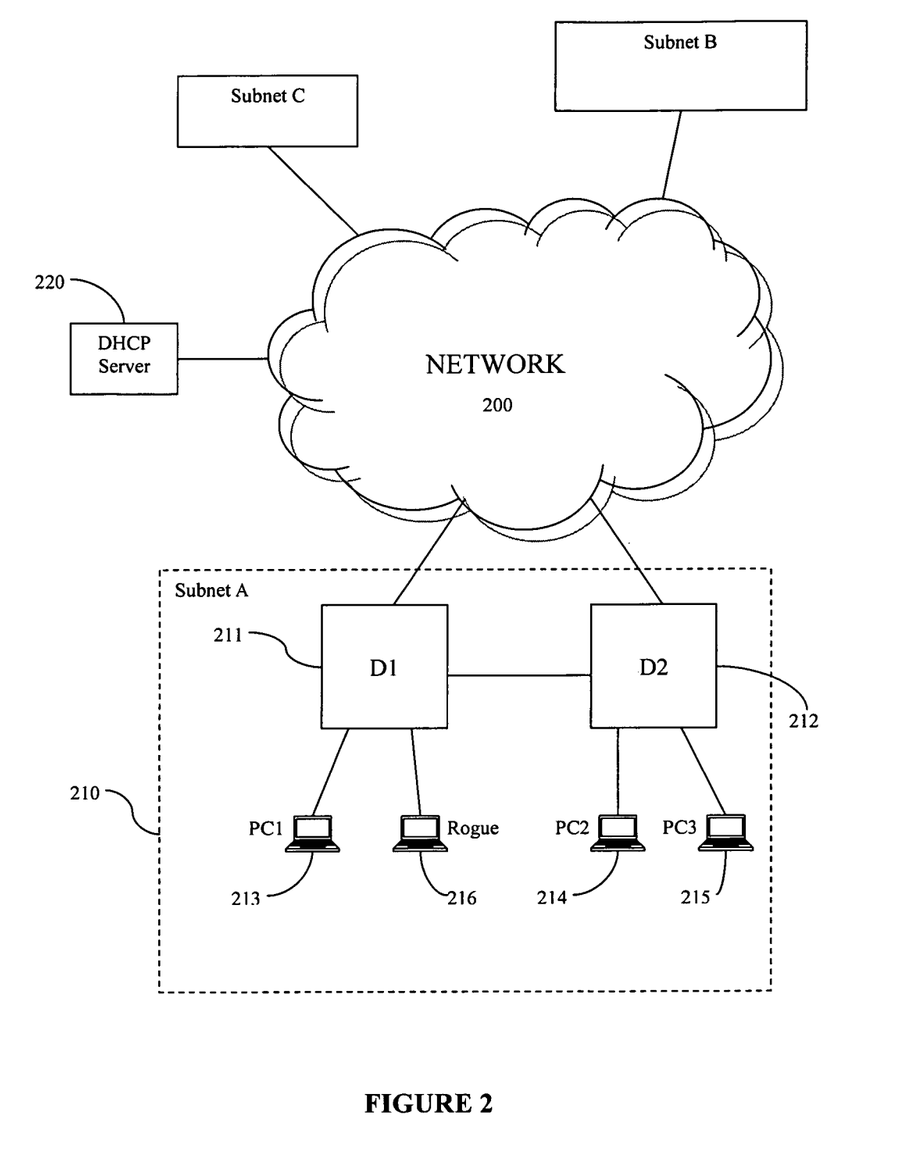
FIG. 2 is a diagram representing a network for use in one embodiment of the present disclosure.

FIG. 2 is a diagram representing a network for use in one embodiment of the present disclosure. Referring to FIG. 2, subnet A 210 is a subnet of a network 200 including distribution layer switches 211, 212 and host devices 213-216, such as PCs for example. The network setup of FIG. 2 does not include an access layer, so the host devices 213-216 connect directly to the distribution layer switches 211, 212. A DHCP server 220 may be used for the automatic configuration of the IP addresses of the host devices 213-216 in the subnet 210 of the network 200.

In one embodiment of the present disclosure, the subnet 210 is running protocols for establishing a default gateway, such as, but not limited to, HSRP or VRRP. The protocols determine a default gateway and transmit the MAC address and IP address of the default gateway via a multicast transmission to the switches 211, 212 in the subnet 210 of the network 200. While it is shown in FIG. 2 only two distribution layers switches 211, 212, it is commonly known that any number of switches may be present in the distribution layer of the subnet 210. Connected to the distribution layer switches 211, 212 are host devices 213-216. While it is shown in FIG. 2 only four host devices 213-216 connected to the distribution layer switches 211, 212, it is understood that any number of host devices may be connected to the distribution layer switches 211, 212. The information relating to the MAC address and IP address of the default gateway is stored in the ARP table of each switch in the subnet 210 of the network 200.

Still referring to FIG. 2, when a rogue host device 216 with a manually configured IP address that is the same as the IP address of the default gateway, connects to a switch 211 in the distribution layer of the subnet 210, the MAC address associated with the IP address of the default gateway in the ARP table of the switch 211 will change from the MAC address of the gateway switch to the MAC address of the rogue host device 216. When the change in the ARP table is detected by the switch 211 to which the rogue host device 216 is connected, the switch 211 refers to a table of MAC addresses and corresponding port numbers, such as a forwarding table, to determine the port to which the rogue host device 216 is connected. This port may then be disabled, and the next transmission by the default gateway will refresh the ARP table in the switches to indicate the correct MAC address and corresponding IP address of the default gateway.

Still referring to FIG. 2, in yet another embodiment of the present disclosure, subnet A 210 may include a load balancing router redundancy, such as, but not limited to, GLBP. In a network setup with a load balancing router redundancy protocol solution, the host load is balanced between a predetermined number of distribution layer switches 211, 212. Therefore, there is no single default gateway. In this case, the multicast transmission of the GLBP and updates the ARP tables to include the MAC and IP address information of all the switches in the distribution layer 211, 212 acting as gateway switches. When a rogue host device 216 with a manually configured IP address that is the same as the IP address of any of the gateway distribution layer switches 211, 212, connects to a distribution layer switch 211, the change in MAC address associated with the IP address of the gateway distribution layer switch 211, 212 is reflected in the ARP table. This change in the ARP table appears as an overwriting of the MAC address of the gateway that is associated with the IP address of one of the gateway switches 211, 212 in the distribution layer of the subnet 210, with the MAC address of the rogue host device 216.

When the change in the ARP table is detected by the switch 211 to which the rogue host device 216 is connected, the switch 211 refers to a table of MAC addresses and corresponding port numbers, such as a forwarding table, to determine the port to which the rogue host device 216 is connected. This port may then be disabled, and the next multicast transmission will refresh the ARP table to indicate the correct MAC addresses and corresponding IP addresses of the gateway distribution layer switches 211, 212.

Referring back to FIG. 1, in yet another embodiment of the present disclosure, the ARP table of the access layer switch 113 may be updated to include the MAC addresses and corresponding IP addresses of all the distribution layer switches 111, 112. This update may be transmitted via a multicast transmission by any possible gateway routing protocol deployed by the network, whether it be a load balancing protocol, such as GLBP, a default gateway protocol, such as HSRP and VRRP, or any other gateway routing protocol.

In this case, the access layer switch 113 listens to the multicast transmission of the gateway routing protocol and updates its ARP table to include the MAC address and IP address information of all the switches in the distribution layer 111, 112. This enables the gateway routing protocol to change which switches act as gateways without a need update the ARP table of the access layer switches. When a rogue host device 116 with a manually configured IP address that is the same as the IP address of any of the distribution layer switches 111, 112, connects to an access layer switch 113, the change in MAC address associated with the IP address of the distribution layer switch 111, 112 is reflected in the ARP table. This change in the ARP table appears as an overwriting of the MAC address of the distribution layer switch 111, 112 that is associated with the known IP address of said switch in the distribution layer of the subnet 110, with the MAC address of the rogue host device 116.

When the change in the ARP table is detected by the access layer switch 113 to which the rogue host device 116 is connected, the access layer switch 113 refers to a table of MAC addresses and corresponding port numbers, such as a forwarding table, to determine the port to which the rogue host device 116 is connected. This port may then be disabled, and the next multicast transmission by the gateway routing protocol will refresh the ARP table to indicate the correct MAC addresses and corresponding IP addresses of the distribution layer switches 111, 112.

Figure 3:
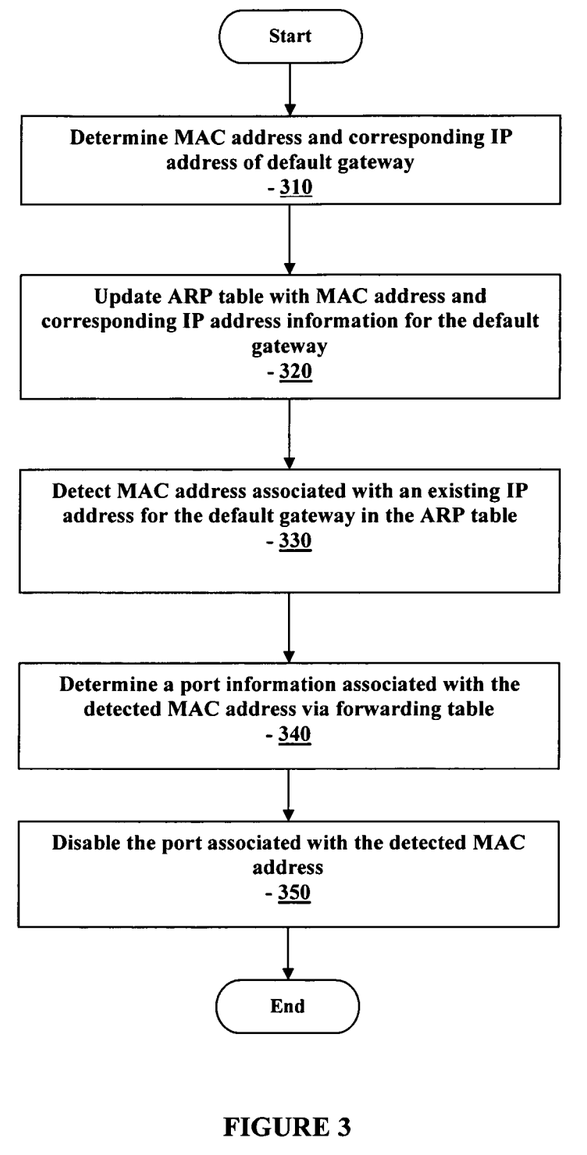
FIG. 3 is a flow chart illustrating a routine performed by a distribution layer switch in one embodiment of the present disclosure.

FIG. 3 is a flow chart illustrating a routine performed by a distribution layer switch in one embodiment of the present disclosure. Referring now to FIGS. 2-3, in one embodiment of the present disclosure, a subnet of a network has distribution layer switches 211, 212 to which host devices 213-216 are directly connected. A routing protocol for establishing a default gateway, such as HSRP, is used to determine the MAC address and corresponding IP address of the default gateway 310. The HSRP multicast transmits the MAC address and IP address information of the default gateway to the switches 211, 212 of the subnet 210 of the network 200. The ARP table of the switches 211, 212 is updated with the MAC address and IP address information of the default gateway 320.

When a new rogue host device 216 with a manually configured IP address that is the same as the known IP address of the default gateway, connects to a switch 211 in the distribution layer of the subnet, the ARP table of the switch 211 is updated. The MAC address of the default gateway is overwritten by the MAC address of the rogue host device 216 in the ARP table 330. The switch 211 detects this change in the ARP table, and determines the port of the switch 211 that is associated with the MAC address of the rogue host device 216 by use of a table of corresponding MAC addresses and port locations, such as the forwarding table of the switch 340. Once the port associated with the rogue host device 216 is located, the switch 211 may disable the port 350 and the ARP table will refresh to the correct MAC address associated with the IP address of the default gateway the next time the HSRP multicast transmits the MAC address and IP address information of the default gateway.

Figure 4:
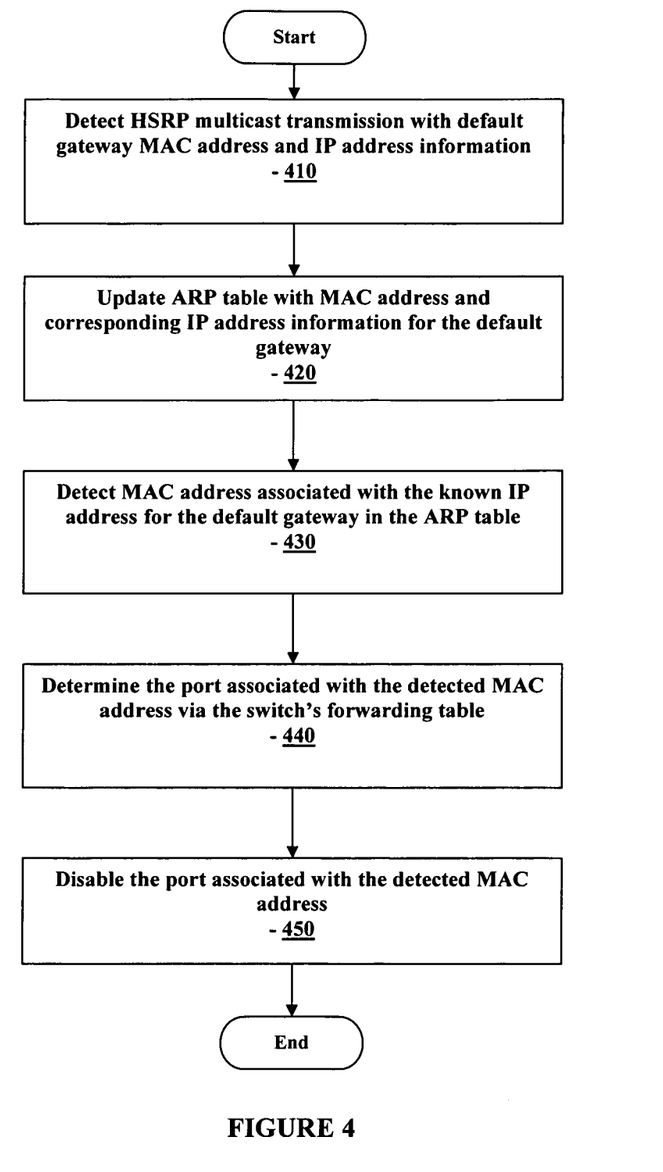
FIG. 4 is a flow chart illustrating a routine performed by an access layer switch in one embodiment of the present disclosure.

FIG. 4 is a flow chart illustrating a routine performed by an access layer switch in one embodiment of the present discloser. Referring now to FIGS. 1 and 4, in one embodiment of the present disclosure, a subnet of a network has distribution layer switches 111, 112 to which access layer switches 113 are connected, and host devices 114-116 connected to the access layer switches 113. A routing protocol for establishing a default gateway, such as HSRP, is used to determine the MAC address and corresponding IP address of the default gateway. The access layer switch 113 listens to the HSRP multicast transmission that includes MAC address and IP address information of the default gateway 410. The access layer switch 113 detects the information in the HSRP multicast transmission and the ARP table of the access layer switch 113 is updated with the MAC address and IP address information of the default gateway 420.

When a new rogue host device 116 with a manually configured IP address that is the same as the known IP address of the default gateway, connects to an access layer switch 113 in the access layer of the subnet 110, the ARP table of the switch 113 is updated. The MAC address of the default gateway is overwritten by the MAC address of the rogue host device 116 in the ARP table 430. The access layer switch 113 detects this change in the ARP table, and determines the port of the switch 113 that is associated with the MAC address of the rogue host device 116 by use of a table of corresponding MAC addresses and port locations, such as the forwarding table of the switch 440. Once the port associated with the rogue host device 116 is located, the access layer switch 113 may disable the port 450 and the ARP table will refresh to the correct MAC address associated with the IP address of the default gateway the next time the HSRP multicast transmits the MAC address and IP address information of the default gateway.

Figure 5:
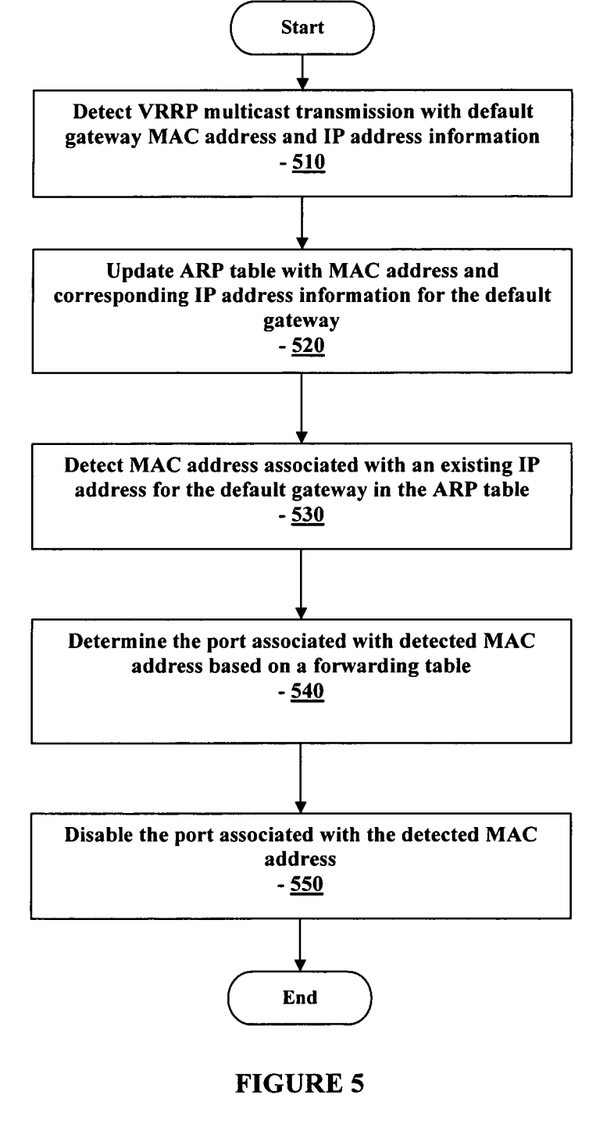
FIG. 5 is a flow chart illustrating a routine performed by an access layer switch in another embodiment of the present disclosure.

FIG. 5 is a flow chart illustrating a routine performed by an access layer switch in another embodiment of the present discloser. Referring now to FIGS. 1 and 5, in one embodiment of the present disclosure, a subnet of a network has distribution layer switches 111, 112 to which access layer switches 113 are connected, and host devices 114-116 connected to the access layer switches 113. A routing protocol for establishing a default gateway, such as VRRP, is used to determine the MAC address and corresponding IP address of the default gateway. The access layer switch 113 listen to the VRRP multicast transmission that includes MAC address and IP address information of the default gateway 510. The access layer switch 113 detects the information in the VRRP multicast transmission and the ARP table of the access layer switch 113 is updated with the MAC address and IP address information of the default gateway 520.

When a new rogue host device 116 with a manually configured IP address that is the same as the known IP address of the default gateway, connects to an access layer switch 113 in the access layer of the subnet 110, the ARP table of the access layer switch 113 is updated. The MAC address of the default gateway is overwritten by the MAC address of the rogue host device 116 in the ARP table 530. The access layer switch 113 detects this change in the ARP table, and determines the port of the switch 113 that is associated with the MAC address of the rogue host device 116 by use of a table of corresponding MAC addresses and port locations, such as the forwarding table of the switch 540. Once the port associated with the rogue host device 116 is located, the access layer switch 113 may disable the port 550 and the ARP table will refresh to the correct MAC address associated with the IP address of the default gateway the next time the VRRP multicast transmits the MAC address and IP address information of the default gateway.

Figure 6:
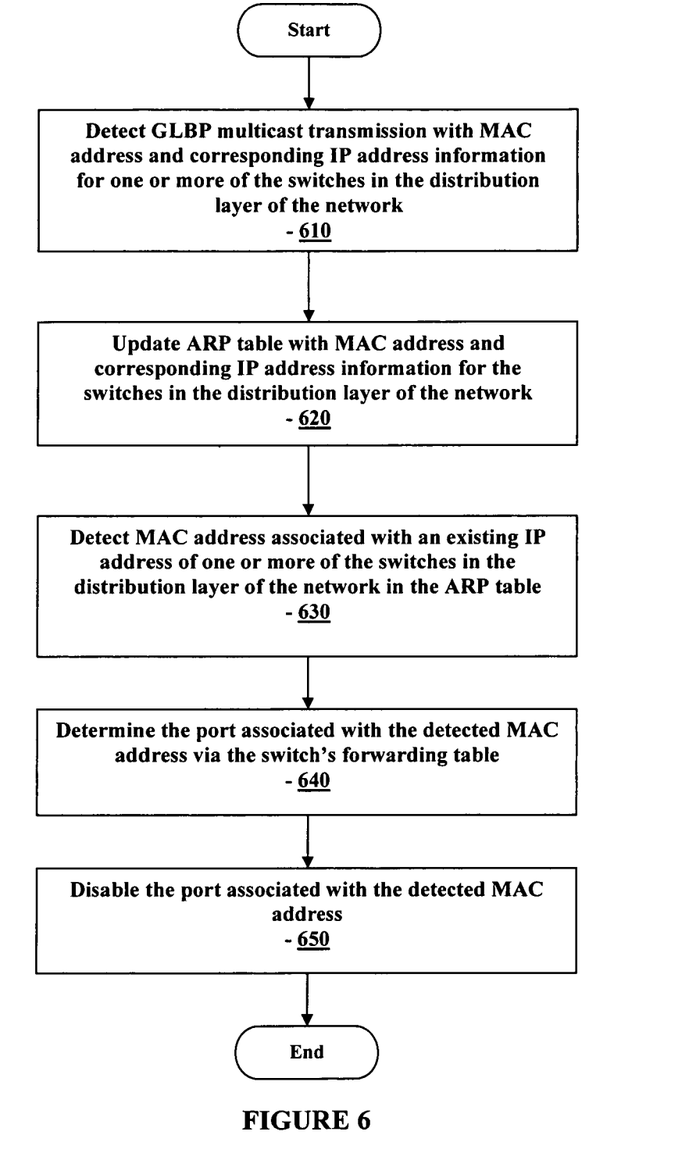
FIG. 6 is a flow chart illustrating a routine performed by an access layer switch in yet another embodiment of the present disclosure.

FIG. 6 is a flow chart illustrating a routine performed by an access layer switch in yet another embodiment of the present disclosure. Referring now to FIGS. 1 and 6, in one embodiment of the present disclosure, a subnet of a network has distribution layer switches 111, 112 to which access layer switch 113 are coupled, and host devices 114-116 coupled to the access layer switch 113. A load balancing router redundancy solution, such as GLBP, is used to determine the MAC address and corresponding IP address of one or more of the distribution layer switches 111, 112. Since there is no single default gateway in a GLBP solution, the access layer switch 113 listens to the GLBP multicast transmission that includes MAC address and IP address information of one or more of the distribution layer switches 111, 112 that are used in the load balancing solution 610. The access layer switch 113 detects the information in the GLBP multicast transmission and the ARP table of the access layer switches 113 is updated with the MAC address and IP address information of the distribution layer switches 111, 112 that are used in the load balancing routing of the subnet 110 of the network 620.

When a new rogue host device 116 with a manually configured IP address that is the same as the known IP address of any of the distribution layer switches 111, 112 used in the load balanced routing, connects to an access layer switch 113 in the access layer of the subnet 110, the ARP table of the access layer switch 113 is updated. The MAC address of the default gateway is overwritten by the MAC address of the rogue host device 116 in the ARP table 630. The access layer switch 113 detects this change in the ARP table, and determines the port of the switch 113 that is associated with the MAC address of the rogue host device 116 by use of a table of corresponding MAC addresses and port locations, such as the forwarding table of the switch 640. Once the port associated with the rogue host device 116 is located, the access layer switch 113 may disable the port 650 and the ARP table will refresh to the correct MAC address associated with the IP address of the distribution layer switch 111, 112 the next time the GLBP multicast transmits the MAC address and IP address information for the distribution layer switches 111, 112 used in the load balancing of the subnet 110 of the network 100.

Figure 7:
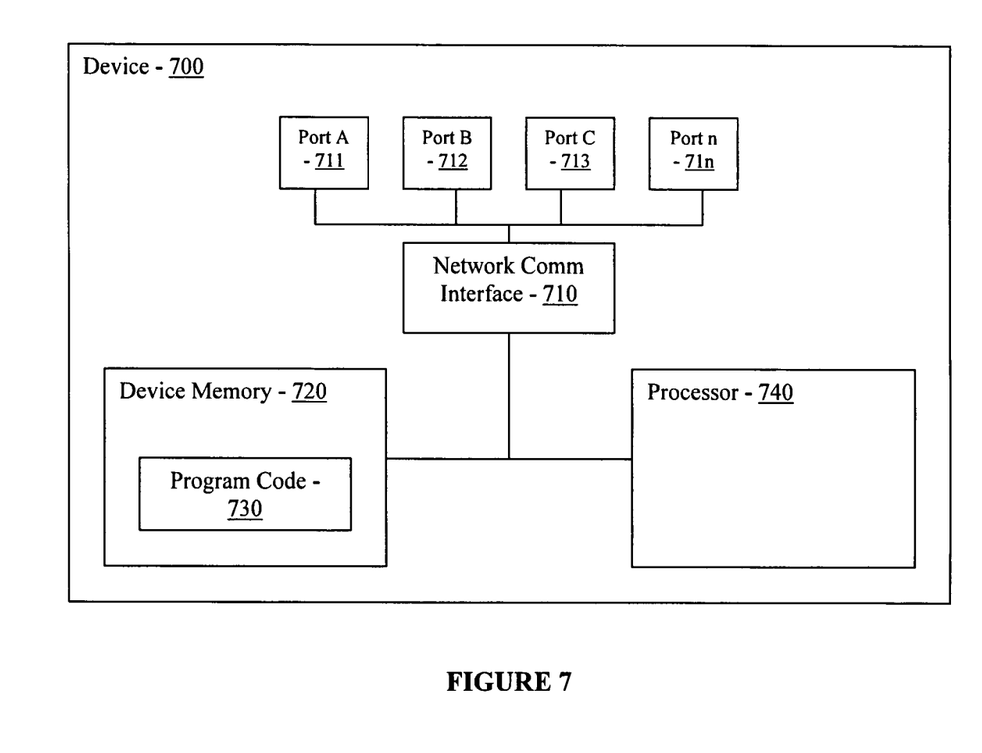
FIG. 7 is a block diagram of a network device for practicing one or more embodiments of the present disclosure.

FIG. 7 is a block diagram of a network device for practicing one or more embodiments of the present disclosure. The device 700 includes a network communication interface 710 with one or more communication terminals 711-71$n$, coupled to one or more processors 740, which will execute a set of instruction 730 encoded onto a memory 720. The program code 730 stored in the memory 720 is a set of instructions that when executed by the one or more processors 740 executes one or more of the above routines, for example, but not limited to, a routing protocol for establishing a default gateway, such as HSRP or VRRP, or a load balancing router redundancy solution, such as GLBP.

The one or more routines described above in conjunction with FIGS. 3-6 may be implemented through a process of listening to the multicast transmission of the gateway protocols to update a table of MAC addresses and corresponding IP addresses, such as an ARP table, with the MAC addresses and corresponding IP addresses for any gateways in the network, or subnet of a network, and watching for a change in the MAC address corresponding with the known IP address of any such gateways. The change in the MAC address corresponding with the known IP address of any known gateway in the network indicates the connection of a manually configured rogue host device to one or the ports, or communication terminals 711-71$n$, of the communication interface 710 of the routing apparatus device 700. Once this change is discovered, the switch may look to a table of MAC addresses and corresponding ports 711-71$n$, such as a forwarding table, and determine the port 711-71$n$ to which the rogue host device is connected. This port 711-71$n$ may then be disabled, removing the host device with the duplicate IP address from the network.

In one aspect, gateway security in a network may be performed by determining one or more gateways of a network, or subnet of a network, and determining the MAC address and corresponding IP address of the gateways. The known MAC and IP addresses of the gateways is stored in a table that is refreshed each time the MAC address and IP address information for the gateways is transmitted. Upon determination of a rogue MAC address associated with the known IP address of a gateway, the switch may disable the port of the rogue MAC address, thus preventing the duplication of IP addresses of the gateways.

Accordingly, in one aspect of the present disclosure, gateway security may be implemented in a network. More specifically, the purpose is to protect against duplication of the Internet Protocol (IP) address of a gateway of a network.

In one embodiment of the present disclosure, for a network setup running a routing protocol for establishing a default gateway, such Hot Standby Router Protocol (HSRP) or Virtual Router Redundancy Protocol (VRRP), a table of Media Access Control (MAC) addresses and corresponding IP addresses, such as an Address Resolution Protocol (ARP) table, is updated to include the MAC address and IP address of the determined default gateway. When a switch in the network detects a change in the ARP table of a rogue MAC address associated with the known IP address of the default gateway, the switch may determine via a table of MAC addresses and corresponding ports, such as a forwarding table, which port is the source of the rogue MAC address. The switch may then disable the port with the rogue MAC address, and the ARP table will refresh to the correct MAC address corresponding to the IP address of the default gateway the next time the routing protocol updates and transmits the MAC address and IP address information for the default gateway.

In another one embodiment of the present disclosure, for a network setup running a routing protocol for establishing a load balancing router redundancy solution, such as Gateway Load Balancing Protocol (GLBP), a table of Media Access Control (MAC) addresses and corresponding IP addresses, such as an Address Resolution Protocol (ARP) table, is updated to include the MAC addresses and IP addresses of the switches determined to be gateways by the load balancing protocol. When a switch in the network detects a change in the ARP table of a rogue MAC address associated with any of the known IP addresses of the gateways, the switch may determine via a table of MAC addresses and corresponding ports, such as a forwarding table, which port is the source of the rogue MAC address. The switch may then disable the port with the rogue MAC address, and the ARP table will refresh to the correct MAC address corresponding to the IP address of the gateway the next time the routing protocol updates and transmits the MAC address and IP address information for the network gateways.

Accordingly, in accordance with the various embodiments of the present disclosure, there are provided methods and apparatus for network configuration including determining one or more gateways of a network, or subnet of a network, and determining the MAC address and corresponding IP address of the gateways are provided. The known MAC and IP addresses of the gateways are stored in a table that is refreshed each time the MAC address and IP address information for the gateways is transmitted. Upon determination of a rogue MAC address associated with the known IP address of a gateway, the switch may disable the port of the rogue MAC address, thus preventing the duplication of IP addresses of the gateways.

A method in particular embodiments includes determining a default gateway of a network, determining a MAC address and an IP address associated with the default gateway of the network, updating a table of one or more MAC addresses and corresponding one or more IP addresses based on the detected MAC address and the IP address of the default gateway, detecting in the table of one or more MAC addresses and the corresponding one or more IP addresses, a further MAC address associated with the IP address of the default gateway, determining a port associated with the further MAC address and with the IP address of the default gateway, and disabling the port.

Determining the default gateway may be based, at least in part, based on one of Hot Standby Router Protocol (HSRP) or Virtual Router Redundancy Protocol (VRRP) protocols.

The MAC address and corresponding IP address of the default gateway of the network may be determined at least in part based on a multicast transmission, where the multicast transmission may be based on one of Hot Standby Router Protocol (HSRP) or Virtual Router Redundancy Protocol (VRRP) protocols.

The table of one or more MAC addresses and the corresponding one or more IP addresses may include an Address Resolution Protocol (ARP) table.

The port associated with the further MAC address may be determined based on a forwarding table.

A method in accordance with particular embodiment includes determining a MAC address and a corresponding IP address of each of a plurality of network devices configured as a gateway in a distribution layer of a network, updating a table of one or more MAC addresses and corresponding IP addresses based on the determined MAC address and the corresponding IP address of each of the plurality of network devices configured as a gateway in the distribution layer, detecting a further MAC address associated with the one of the IP addresses of one of the plurality of network devices in the table, determining a port associated with the further MAC address and with the one of the IP addresses of one of the plurality of network devices in the table, and disabling the port.

The MAC address and corresponding IP address of the plurality of network devices configured as a gateway may be determined based on a multicast transmission.

Determining the MAC address and the corresponding IP address of each of the plurality of network devices may be based, at least in part on Gateway Load Balancing Protocol (GLBP).

The table of one or more MAC addresses and the corresponding one or more IP addresses may include an Address Resolution Protocol (ARP) table.

The port associated with the further MAC address may be determined based on a forwarding table.

An apparatus in particular embodiments includes a network interface, one or more processors coupled to the network interface, and a memory for storing instructions which, when executed by the one or more processors, causes the one or more processors to determine a default gateway of a network, determine a MAC address and an IP address associated with the default gateway of the network, update a table of one or more MAC addresses and corresponding one or more IP addresses based on the detected MAC address and the IP address of the default gateway, detect in the table of one or more MAC addresses and the corresponding one or more IP addresses, a further MAC address associated with the IP address of the default gateway, determine a port associated with the further MAC address and with the IP address of the default gateway, and disable the port.

The memory for storing instructions which, when executed by the one or more processors, causes the one or more processors to determine the default gateway may be based, at least in part, based on one of Hot Standby Router Protocol (HSRP) or Virtual Router Redundancy Protocol (VRRP) protocols.

In a further aspect, the memory for storing instructions which, when executed by the one or more processors, causes the one or more processors to determine the MAC address and corresponding IP address of the default gateway of the network based at least in part on a multicast transmission.

The multicast transmission may be based on one of Hot Standby Router Protocol (HSRP) or Virtual Router Redundancy Protocol (VRRP) protocols.

The table of one or more MAC addresses and the corresponding one or more IP addresses may include an Address Resolution Protocol (ARP) table.

The memory for storing instructions which, when executed by the one or more processors, causes the one or more processors to determine the port associated with the further MAC address based on a forwarding table.

An apparatus in particular embodiments may include a network interface, one or more processors coupled to the network interface, and a memory for storing instructions which, when executed by the one or more processors, causes the one or more processors to determine a MAC address and a corresponding IP address of each of a plurality of network devices configured as a gateway in a distribution layer of a network, update a table of one or more MAC addresses and corresponding IP addresses based on the determined MAC address and the corresponding IP address of each of the plurality of network devices configured as a gateway in the distribution layer, detect a further MAC address associated with the one of the IP addresses of one of the plurality of network devices in the table, determine a port associated with the further MAC address and with the one of the IP addresses of one of the plurality of network devices in the table, and disable the port.

In a further aspect, the memory for storing instructions which, when executed by the one or more processors, causes the one or more processors to determine the MAC address and the corresponding IP address of each of the plurality of network devices based, at least in part on Gateway Load Balancing Protocol (GLBP).

The table of one or more MAC addresses and the corresponding one or more IP addresses may include an Address Resolution Protocol (ARP) table.

An apparatus in particular embodiments includes means for determining a default gateway of a network, means for determining a MAC address and an IP address associated with the default gateway of the network, means for updating a table of one or more MAC addresses and corresponding one or more IP addresses based on the detected MAC address and the IP address of the default gateway, means for detecting in the table of one or more MAC addresses and the corresponding one or more IP addresses, a further MAC address associated with the IP address of the default gateway, means for determining a port associated with the further MAC address and with the IP address of the default gateway, and means for disabling the port.

Various other modifications and alterations in the structure and method of operation of the particular embodiments will be apparent to those skilled in the art without departing from the scope and spirit of the disclosure. Although the disclosure has been described in connection with specific particular embodiments, it should be understood that the disclosure as claimed should not be unduly limited to such particular embodiments. It is intended that the following claims define the scope of the present disclosure and that structures and methods within the scope of these claims and their equivalents be covered thereby.

What is claimed is:

1. A method, comprising:
   determining a default gateway of a network;
   determining, at a switch of the network, a MAC address and an IP address associated with the default gateway of the network;
   updating an entry of a table having one or more MAC addresses and corresponding one or more IP addresses, the table stored at a memory of the switch, the entry of the table updated to include the MAC address and the IP address of the default gateway;
   detecting a change to the MAC address stored in the entry of the table that corresponds to the default gateway;
   in response to detecting the change to the MAC address, determining a port of the switch that is associated with the MAC address to which the entry of the table that corresponds to the default gateway has been changed; and
   disabling the determined port.

2. The method of claim 1, wherein determining the default gateway is based, at least in part, based on one of Hot Standby Router Protocol (HSRP) or Virtual Router Redundancy Protocol (VRRP) protocols.

3. The method of claim 1, wherein the MAC address and corresponding IP address of the default gateway of the network is determined at least in part based on a multicast transmission.

4. The method of claim 3, wherein the multicast transmission is based on one of Hot Standby Router Protocol (HSRP) or Virtual Router Redundancy Protocol (VRRP) protocols.

5. The method of claim 1, wherein the table of one or more MAC addresses and the corresponding one or more IP addresses includes an Address Resolution Protocol (ARP) table.

6. The method of claim 1, wherein the port associated with the MAC address to which the table entry has been changed is determined based on a forwarding table.

7. The method of claim 1, wherein the determining the port of the switch that is associated with the MAC address includes:
   referring to a forwarding table at the switch that stores a plurality of MAC addresses and corresponding port numbers.

8. The method of claim 1, wherein the determining the MAC address of the default gateway of the network includes listening at the switch for a multicast transmission by the default gateway according to a gateway establishing protocol.

9. The method of claim 8, further comprising:
   in response to receipt by the switch of a subsequent multicast transmission by the default gateway according to the gateway establishing protocol, refreshing the entry of the table with the MAC address of the default gateway.

10. A method, comprising:
    determining, at a switch of a network, a MAC address and a corresponding IP address of each of a plurality of network devices configured as gateways in a distribution layer of the network;
    updating respective entries of a table having one or more MAC addresses and corresponding IP addresses, the table stored at a memory of the switch, the updated entries of the table including the determined MAC address and the corresponding IP address of each of the plurality of network devices configured as gateways in the distribution layer;
    detecting a change to the MAC address stored in an entry of the table that corresponds to one of the network devices configured as gateways;
    in response to detecting the change to the MAC address, determining a port of the switch that is associated with the MAC address in the entry of the table that corresponds to the one of the network devices configured as gateways in the table; and
    disabling the determined port.

11. The method of claim 10, wherein the MAC address and corresponding IP address of the plurality of network devices configured as gateways is determined based on a multicast transmission.

12. The method of claim 10 wherein determining the MAC address and the corresponding IP address of each of the plurality of network devices is based, at least in part on Gateway Load Balancing Protocol (GLBP).

13. The method of claim 10, wherein the table of one or more MAC addresses and the corresponding one or more IP addresses includes an Address Resolution Protocol (ARP) table.

14. The method of claim 10, wherein the port associated with the MAC address to which the table entry has been changed is determined based on a forwarding table.

15. An apparatus, comprising:
    a network interface;
    one or more processors coupled to the network interface; and
    a memory for storing instructions which, when executed by the one or more processors, causes the one or more processors to
    determine a default gateway of a network;
    determine a MAC address and an IP address associated with the default gateway of the network;
    update an entry of a table having one or more MAC addresses and corresponding one or more IP addresses, the table stored at a memory of the switch, the entry of the table updated to include the MAC address and the IP address of the default gateway;

detect a change to the MAC address stored in the entry of the table that corresponds to the default gateway;

in response to detecting the change to the MAC address, determine a port that is associated with the MAC address to which the entry of the table that corresponds to the default gateway has been changed; and disable the determined port.

16. The apparatus of claim 15, wherein the memory for storing instructions which, when executed by the one or more processors, causes the one or more processors to determine the default gateway is based, at least in part, on one of Hot Standby Router Protocol (HSRP) or Virtual Router Redundancy Protocol (VRRP) protocols.

17. The apparatus of claim 15, wherein the memory for storing instructions which, when executed by the one or more processors, causes the one or more processors to determine the MAC address and corresponding IP address of the default gateway of the network based at least in part on a multicast transmission.

18. The apparatus of claim 17, wherein the multicast transmission is based on one of Hot Standby Router Protocol (HSRP) or Virtual Router Redundancy Protocol (VRRP) protocols.

19. The apparatus of claim 15, wherein the table of one or more MAC addresses and the corresponding one or more IP addresses includes an Address Resolution Protocol (ARP) table.

20. The apparatus of claim 15, wherein the memory for storing instructions which, when executed by the one or more processors, causes the one or more processors to determine the port associated with the MAC address to which the table entry has been changed based on a forwarding table.

21. An apparatus, comprising:
a network interface;
one or more processors coupled to the network interface; and
a memory for storing instructions which, when executed by the one or more processors, causes the one or more processors to
determine a MAC address and a corresponding IP address of each of a plurality of network devices configured as gateways in a distribution layer of a network;
update respective entries of a table having one or more MAC addresses and corresponding IP addresses, the updated entries of the table including the determined MAC address and the corresponding IP address of each of the plurality of network devices configured as gateways in the distribution layer;
detect a change to the MAC address stored in an entry of the table that corresponds to one of the network devices configured as gateways;
in response to detecting the change to the MAC address, determine a port that is associated with the MAC address in the entry of the table that corresponds to the one of the plurality of network devices configured as gateways in the table; and
disable the determined port.

22. The apparatus of claim 21, wherein the memory for storing instructions which, when executed by the one or more processors, causes the one or more processors to determine the MAC address and the corresponding IP address of each of the plurality of network devices is based, at least in part on Gateway Load Balancing Protocol (GLBP).

23. The apparatus of claim 21, wherein the table of one or more MAC addresses and the corresponding one or more IP addresses includes an Address Resolution Protocol (ARP) table.

* * * * *